US006616704B1

(12) United States Patent
Birman et al.

(10) Patent No.: US 6,616,704 B1
(45) Date of Patent: Sep. 9, 2003

(54) TWO STEP METHOD FOR CORRECTING SPELLING OF A WORD OR PHRASE IN A DOCUMENT

(75) Inventors: Alexander Birman, Chappaqua, NY (US); Harry R. Gail, Jr., Ossining, NY (US); Sidney L. Hantler, Cortlandt Manor, NY (US); George B. Leeman, Jr., Ridgefield, CT (US); Daniel Milch, Ossining, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/665,897

(22) Filed: Sep. 20, 2000

(51) Int. Cl.$^7$ ............................................... G06F 17/21
(52) U.S. Cl. ........................ 715/533; 707/531; 707/532
(58) Field of Search ................................. 707/532, 533, 707/531; 715/532, 533, 531

(56) References Cited

U.S. PATENT DOCUMENTS

| | | | | |
|---|---|---|---|---|
| 5,218,536 A | * | 6/1993 | McWherter | 707/533 |
| 5,465,309 A | * | 11/1995 | Johnson | 382/229 |
| 5,572,423 A | * | 11/1996 | Church | 707/533 |
| 5,845,306 A | * | 12/1998 | Schabes et al. | 707/532 |
| 5,901,255 A | * | 5/1999 | Yagasaki | 382/310 |
| 6,041,323 A | * | 3/2000 | Kubota | 707/5 |

OTHER PUBLICATIONS

Veronis, "Correction of phonographic errors in natural language interfaces", ACM, 1988, pp. 101–115.*
Peterson, "Computer programs for detecting and correcting spelling errors", Communications of the ACM, vol. 23, No. 12, Dec. 1980, pp. 676–687.*
Turba, "Checking for spelling and typographical errors in computer–based text", Proceedings of the ACM SIGPLAN SIGOA symposium on Text manipulation, Jun. 1981, pp. 51–60.*
R. Wagner et al., "The String–to–String Correction Problem", Journal of the Association for Computing Machinery, vol. 21, No. 1, Jan. 1974, pp. 168–173.
E. Ukkonen, "Algorithms for Approximate String Matching", Information and Control, 64, pp. 100–118 (1985).

* cited by examiner

Primary Examiner—Stephen S. Hong
(74) Attorney, Agent, or Firm—Whitham, Curtis & Christofferson, P.C.; Stephen C. Kaufman

(57) ABSTRACT

A very fast method for correcting the spelling of a word or phrase in a document proceeds in two steps: first applying a very fast approximate method for eliminating most candidate words from consideration (without computing the exact edit distance between the given word whose spelling is to be corrected and any candidate word), followed by a "slow method" which computes the exact edit distance between the word whose spelling is to be corrected and each of the few remaining candidate words. The combination results in a method that is almost as fast as the fast approximate method and as exact as the slow method.

4 Claims, 2 Drawing Sheets

TWO STEP METHOD FOR CORRECTING SPELLING OF A WORD OR PHRASE IN A DOCUMENT

BACKGROUND OF THE INVENTION

1. Field of the Invention

The present invention generally relates to a very fast method for correcting the spelling of a word or phrase in a document. The method has application to any technique which searches documents.

2. Background Description

Suppose that we are given a word, G, and we wish to find one or more other words from a list of candidate words that are within a given edit distance from G. Here, the edit distance between two words is the smallest number of operations which transform the candidate word into the given word (each operation consisting of removing one letter, adding one letter, replacing one letter with another letter, or transposing two letters).

In "The String-to-String Correction Problem", JACM, 21(1), pp. 168–173 (1974), R. A. Wagner and M. J. Fischer showed that the edit distance between two words G and C could be computed in time proportional to the length of G times the length of C. Subsequently, in "Algorithms for Approximate String Matching", Information and Control, 64, pp. 100–118 (1985), E. Ukkonen improved the running time of the algorithm. This latter result is called the "slow method" in the following description.

SUMMARY OF THE INVENTION

According to the invention, there is provided a method which proceeds in two steps: first applying a very fast method (comparing G to each candidate word) for eliminating most candidate words from consideration (without computing the exact edit distance between G and any candidate word), followed by the "slow method" which computes the exact edit distance between G and each of the few remaining candidate words. The second step is the slow exact method well-known in the art as described by Ukkonen.

The invention consists of (1) a new fast approximate method and (2) combining this fast approximate method with the slow method. The combination results in a method that is almost as fast as the fast approximate method and as exact as the slow method.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

In the following discussion, the following definitions are used:

G is the given word whose spelling is to be corrected.
S is the set of candidate words or phrases to be processed.
$\Delta$ is the maximal edit distance for determining whether a candidate word is acceptable; i.e., if the edit distance between G and a candidate word C exceeds $\Delta$, then C is unacceptable.
W is the set of words that are within distance $\Delta$ of G.
$G_{poll}$ is a vector indexed by the letters of the alphabet under consideration.

We now explain the fast approximate method for deciding whether to eliminate candidate word C from consideration. We first pre-compute a vector $G_{poll}$ whose length is the number of letters (or, more generally, legal characters) in the alphabet from which G is constructed. The value of each component of $G_{poll}$ is the number of times the letter corresponding to that component appears in G. The method proceeds by iterating on the letters in C. Two integers are defined: $C_{val}$ (initially set to zero) counts the number of letters already considered in C which do not appear in G, and $G_{val}$ (initially set to the length of G) counts the number of letters in G which do not appear among the characters already considered in C. To process the next letter l in C, we check the count in the corresponding entry of $G_{poll}$. If that entry is positive, we decrement both $G_{val}$ and the value of the lth component of $G_{poll}$ by one. If that entry is zero, we increment $C_{val}$ by one. After a letter from C is processed, if $C_{val}$ is larger than $\Delta$, we reject C from consideration (i.e., C is unacceptable). We continue letter by letter until either C has been rejected or all its letters have been processed. In the latter case, if $G_{val}$ is larger than $\Delta$, then we reject C from consideration. Otherwise, we accept C and compute its exact edit distance from G by the slow method. We proceed until all candidate words have been processed.

Figure 1A:
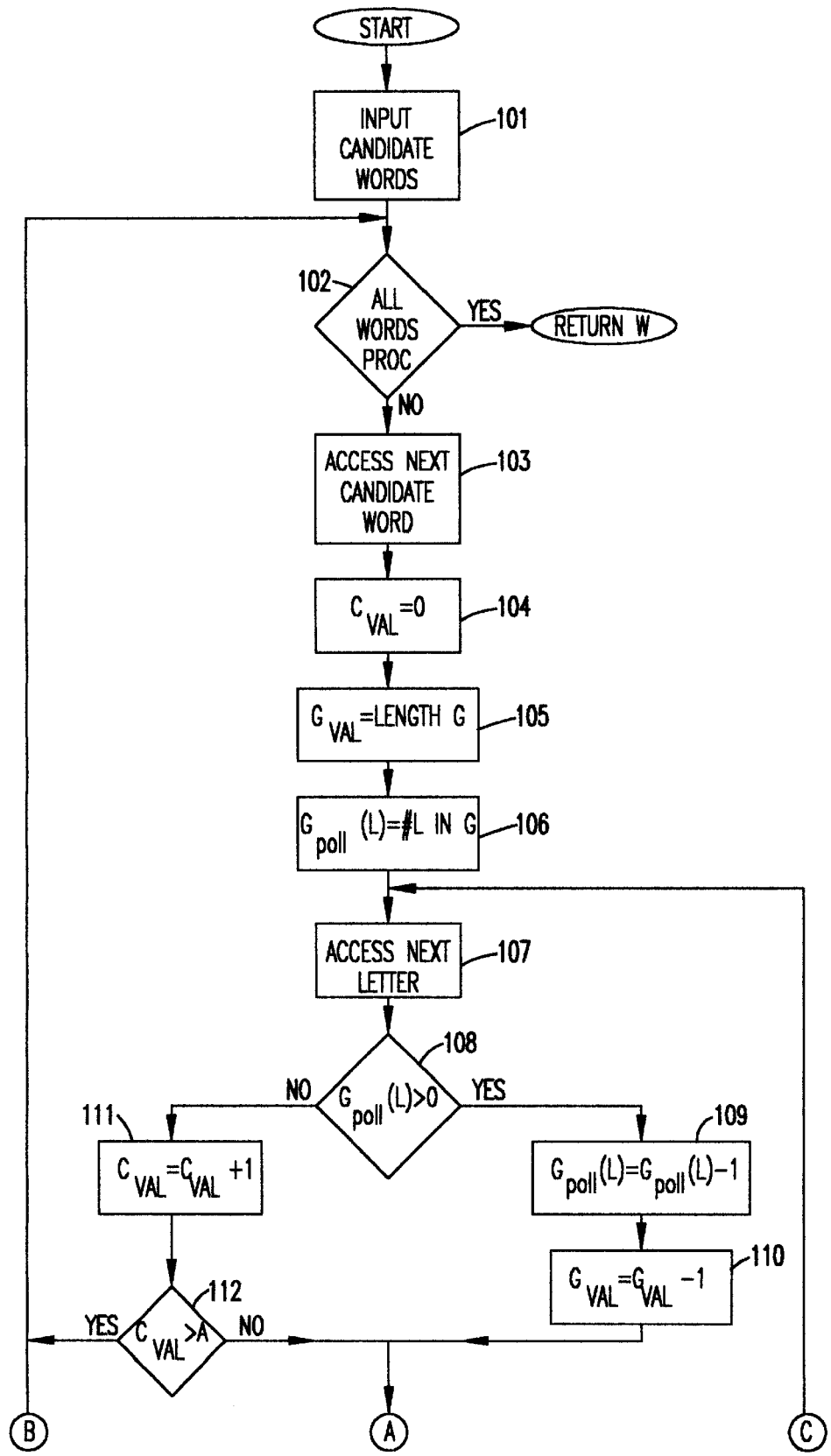
FIGS. 1A and 1B, taken together, are a flow diagram showing the logic of the algorithm implemented by the invention.
Figure 1B:
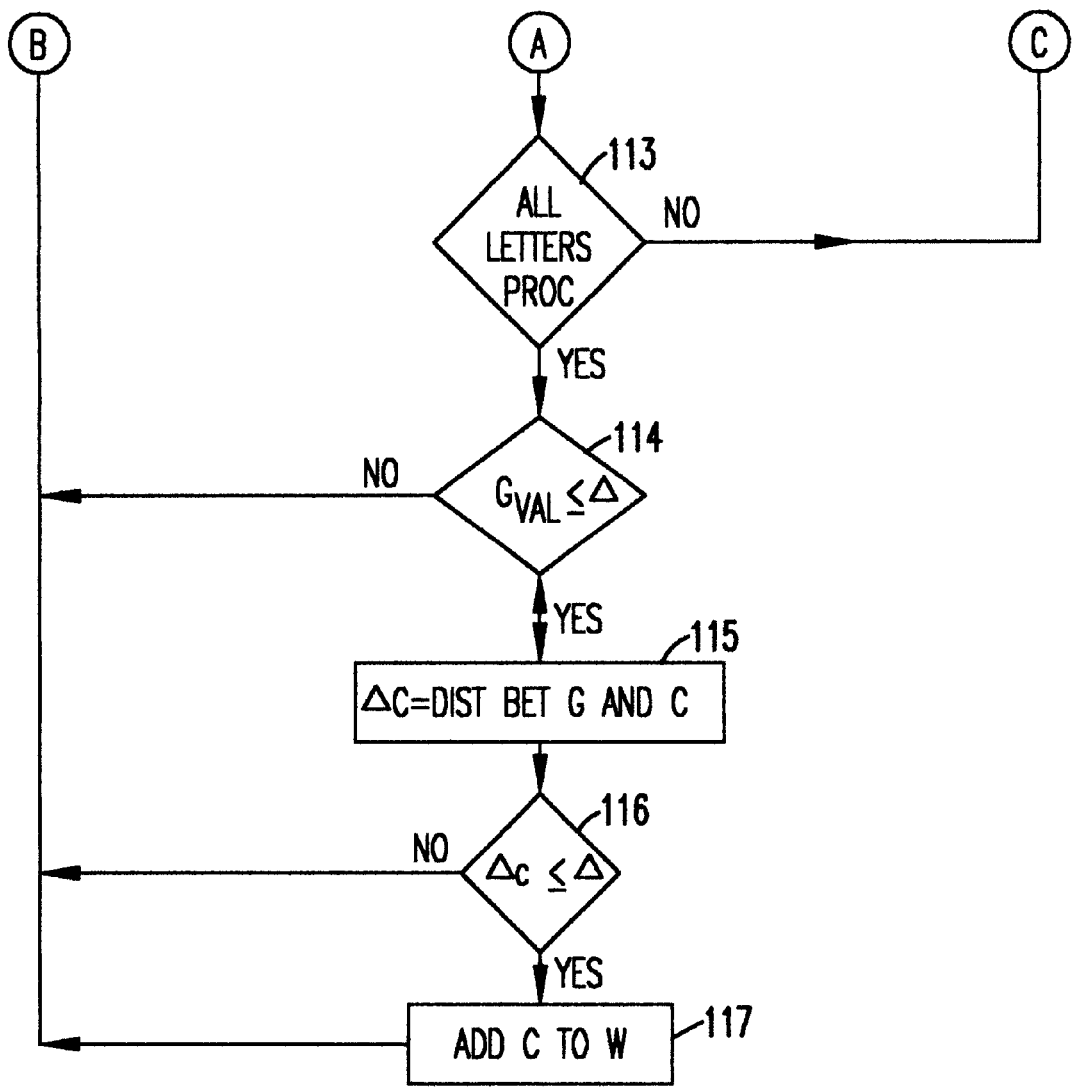

Referring now to the drawings, and more particularly to FIGS. 1A and 1B, there is shown a flow diagram of the logic of the process according to the invention. The process begins by inputting a list of candidate words at function block 101. A test is made in decision block 102 to determine if all words from the candidate word list have been processed. If so, the process returns the set of words W to the main program; otherwise, the next (non-null) candidate word is accessed in function block 103. In function block 104, the value of the integer $C_{val}$ is initialized and set to zero. In function block 105, the value of the integer $G_{val}$ is initialized and set to the length of the given word G. In function block 106, the vector $G_{poll}$ is initialized by setting its entries equal to the number of times each corresponding letter of the alphabet appears in the word G. The next letter l of the candidate word C is accessed in function block 107. A test is made in decision block 108 to determine if $G_{poll}(l)$ is greater than zero. If so, $G_{poll}(l)$ is decremented by one in function block 109, and Gval is decremented by one in function block 110. The process then proceeds to decision block 113. If, however, $G_{poll}(l)$ is zero, then $C_{val}$ is incremented by one in function block 111. A test is made in decision block 112 to determine if $C_{val}$ is greater than the maximal edit distance $\Delta$. If so, the process loops back to decision block 102 to determine if there are more words to be processed. If not, the process proceeds to decision block 113.

A test is made in decision block 113 to determine if all letters have been processed. If not, then the process loops back to function block 107 to access the next letter. Otherwise, a test is made in decision block 114 to determine if $G_{val}$ is less than or equal to the maximal edit distance $\Delta$. If not, the process then loops back to decision block 102 to determine if there are more words to process. If so, $\Delta_c$ is set (using the slow method) to the distance between the candidate word C and the word G whose spelling is to be corrected in function block 115. A test is then made in decision block 116 to determine if the distance $\Delta_c$ is less than or equal to the maximal edit distance $\Delta$. If it is, C is added to W. The process then loops back to decision block 102 to determine if there are more words to process.

The pseudocode that implements the process shown in FIGS. 1A and 1B is listed below:

```
For each candidate word C of S
    C_val=0
    G_val=Length(G)
    G_poll(l)=number of times letter l appears in G
    For each letter Q of C
        If G_poll(l)>0 then
            G_poll(l)=G_poll(l)-1
            G_val=G_val-1
        Else
            C_val=C_val+1
            If C_val>Δ then Process next candidate word
    If G_val≤Δ then
        Δ_c=distance between C and G
        If Δ_c≤Δ then add C to W
    Process next candidate word
```

While the invention has been described in terms of a single preferred embodiment, those skilled in the art will recognize that the invention can be embodiment, those skilled in the art will recognize that the invention can be practiced with modification within the spirit and scope of the appended claims.

Having thus described our invention, what we claim as new and desire to secure by Letters Patent is as follows:

1. A method for correcting the spelling of a word or phrase in a document comprising the steps of:

applying an approximate method for eliminating some candidate words from consideration, without computing an exact edit distance between a given word whose spelling is to be corrected and any candidate word;

followed by applying an exact method which computes an exact edit distance between the word whose spelling is to be corrected and each of the remaining candidate words, wherein G is a given word whose spelling is to be corrected and the approximate method comprises the steps of:

pre-computing a vector $G_{poll}$ whose length is the number of letters in the alphabet from which G is constructed, the value of each component of $G_{poll}$ being a number of times a letter corresponding to that component appears in G;

iterating on the letters in the candidate word or phrase C to be processed by defining two integers $C_{val}$ which counts a number of letters already considered in C which do not appear in G, and $G_{val}$ which counts a number of letters in G which do not appear among the characters already considered in C;

processing a next letter l in C by checking a count in a corresponding entry of $G_{poll}$, and if that entry is positive, decrementing both $G_{val}$ and the value of the lth component of $G_{poll}$ by one, but if that entry is zero, incrementing $C_{val}$ by one;

determining if $C_{val}$ is larger than a maximal edit distance Δ, rejecting C from consideration; and continuing letter by letter until either C has been rejected or all its letters have been processed, and in the latter case, if $G_{val}$ is larger than Δ, then rejecting C from consideration, but otherwise, accepting C, provided its actual distance from G is not more than Δ.

2. The method for correcting the spelling of a word or phrase in a document recited in claim 1, wherein the exact method comprises the step of computing an exact edit distance from G.

3. A computer readable medium containing code implementing a method for correcting the spelling of a word or phrase in a document, the code contained in said computer readable medium comprising:

first code implementing an approximate method for eliminating most candidate words from consideration, without computing an exact edit distance between a given word whose spelling is to be corrected and any candidate word; and second code implementing an exact method which computes an exact edit distance between the word whose spelling is to be corrected and each of the few remaining candidate words, said second code being called after execution of said first code, wherein G is a given word whose spelling is to be corrected and the first code includes:

code for pre-computing a vector $G_{poll}$ whose length is the number of letters in the alphabet from which G is constructed, the value of each component of $G_{poll}$ being a number of times a letter corresponding to that component appears in G;

code for iterating on the letters in the candidate word or phrase C to be processed by defining two integers $C_{val}$ which counts a number of letters already considered in C which do not appear in G, and $G_{val}$ which counts a number of letters in G which do not appear among the characters already considered in C;

code for processing a next letter l in C by checking a count in a corresponding entry of $G_{poll}$, and if that entry is positive, decrementing both $G_{val}$ and the value of the lth component of $G_{poll}$ by one, but if that entry is zero, incrementing $C_{val}$ by one;

code for determining if $C_{val}$ is larger than a maximal edit distance Δ, rejecting C from consideration; and code for continuing letter by letter until either C has been rejected or all its letters have been processed, and in the latter case, if $G_{val}$ is larger than Δ, then rejecting C from consideration, but otherwise, accepting C, provided its actual distance from G is not more than Δ.

4. The computer readable medium recited in claim 3, wherein second code includes code for computing an exact edit distance from G.

* * * * *